(12) United States Patent
Joos et al.

(10) Patent No.: US 11,455,808 B2
(45) Date of Patent: Sep. 27, 2022

(54) METHOD FOR THE CLASSIFICATION OF PARKING SPACES IN A SURROUNDING REGION OF A VEHICLE WITH A NEURAL NETWORK

(71) Applicant: Valeo Schalter und Sensoren GmbH, Bietigheim-Bissingen (DE)

(72) Inventors: Malte Joos, Bietigheim-Bissingen (DE); Mathieu Bulliot, Bietigheim-Bissingen (DE); Mahmoud Shalaby, Bietigheim-Bissingen (DE); Ayman Mahmoud, Bietigheim-Bissingen (DE); Jean-Francois Bariant, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 127 days.

(21) Appl. No.: 16/768,937

(22) PCT Filed: Dec. 6, 2018

(86) PCT No.: PCT/EP2018/083757
§ 371 (c)(1),
(2) Date: Jun. 2, 2020

(87) PCT Pub. No.: WO2019/121035
PCT Pub. Date: Jun. 27, 2019

(65) Prior Publication Data
US 2021/0216797 A1      Jul. 15, 2021

(30) Foreign Application Priority Data
Dec. 19, 2017   (DE) ..................... 10 2017 130 488.6

(51) Int. Cl.
*G08G 1/14*       (2006.01)
*G06V 20/58*      (2022.01)
(Continued)

(52) U.S. Cl.
CPC .......... *G06V 20/586* (2022.01); *B60W 30/06* (2013.01); *G06K 9/6267* (2013.01); *G06N 3/08* (2013.01); *B60W 2555/60* (2020.02)

(58) Field of Classification Search
CPC . G06K 9/00812; G06K 9/6267; B60W 30/06; B60W 2555/60; G06N 3/08;
(Continued)

(56) References Cited

U.S. PATENT DOCUMENTS

| | | | |
|---|---|---|---|
| 9,298,993 B2 * | 3/2016 | Fan | ........................... G06T 7/73 |
| 2002/0044048 A1 * | 4/2002 | Watanabe | ............. G01S 13/931 340/436 |

(Continued)

FOREIGN PATENT DOCUMENTS

| | | |
|---|---|---|
| DE | 102012216994 A1 | 3/2014 |
| DE | 102012023706 A1 | 6/2014 |

(Continued)

OTHER PUBLICATIONS

Amato Giuseppe et al.: "Deep learning for decentralized parking lot occupancy detection", Expert Systems with Applications, Oxford, GB, Bd. 72,29. Oct. 2016 (Oct. 29, 2016), Seiten 327-334, XP029871439, ISSN: 0957-4174, DOI: 10.1016/J. Eswa.2016.10. 055 das ganze Dokument (13 pages).

(Continued)

*Primary Examiner* — Anh V La
(74) *Attorney, Agent, or Firm* — Osha Bergman Watanabe & Burton LLP

(57) ABSTRACT

The invention relates to a method for the classification of parking spaces in a surrounding region of a vehicle with a driver support system, wherein the vehicle comprises at least one first surroundings sensor and a second surroundings sensor, comprising the steps of receiving first sensor data out of the surrounding region by the driver support system from (Continued)

the at least one first surroundings sensor, recognizing a parking-space-like partial region of the surrounding region in the first sensor data, requesting second sensor data acquired by the at least one second surroundings sensor out of the parking-space-like partial region by the driver support system as soon as the parking-space-like partial region is recognized in the first sensor data, transmitting the requested second sensor data to a vehicle-side computing unit comprising a deep neural network (DNN), and classifying the parking-space-like partial region into categories with the DNN, wherein the categories comprise legal, parkable parking spaces and illegal, non-parkable parking spaces. The invention also relates to a driver support system, in particular a parking assistance system, for a vehicle for the acquisition of parking spaces. The invention further relates to a vehicle with a driver support system.

13 Claims, 3 Drawing Sheets

(51) Int. Cl.
*B60W 30/06* (2006.01)
*G06K 9/62* (2022.01)
*G06N 3/08* (2006.01)

(58) Field of Classification Search
CPC ........ G08G 1/143; G08G 1/147; G08G 1/168; G06V 20/586; G06V 10/82

USPC ................... 340/932.2, 937, 988, 990, 995.1
See application file for complete search history.

(56) References Cited

U.S. PATENT DOCUMENTS

| 2014/0085112 | A1 | 3/2014 | Gruteser et al. |
| 2014/0340242 | A1 | 11/2014 | Belzner et al. |
| 2017/0043808 | A1* | 2/2017 | Yang ................... G08G 1/143 |
| 2018/0025640 | A1* | 1/2018 | Micks ................ G06K 9/00812 |
| | | | 340/932.2 |
| 2018/0321685 | A1* | 11/2018 | Yai ....................... G05D 1/0274 |

FOREIGN PATENT DOCUMENTS

| DE | 102016210534 A1 | 12/2017 |
| EP | 2832590 A1 | 2/2015 |
| FR | 2922029 A1 | 4/2009 |
| WO | 2014-202362 A1 | 12/2014 |

OTHER PUBLICATIONS

International Search Report and Written Opinion in corresponding International Application No. PCT/EP2018/083757, dated Mar. 19, 2019 (13 pages).
German Search Report in corresponding German Application No. 10 2017 130 488.6, dated Nov. 28, 2018 (5 pages).

* cited by examiner

METHOD FOR THE CLASSIFICATION OF PARKING SPACES IN A SURROUNDING REGION OF A VEHICLE WITH A NEURAL NETWORK

The present invention relates to a method for the classification of parking spaces in a surrounding region of a vehicle, wherein first sensor data acquired from the surrounding region through at least one first vehicle-side surroundings sensor are received by a vehicle-side driver support system and a parking-space-like partial region of the surrounding region is recognized in the first sensor data. The present invention also relates to a driver support system, in particular a parking assistance system for a vehicle. The present invention further relates to a vehicle with a driver support system, in particular a parking assistance system.

BACKGROUND

Driver support systems, in particular driver assistance systems, are systems developed to automate vehicle systems and to improve them from the point of safety and improved driving behaviour. In this context safety features have been developed in order to avoid collisions or accidents, in that technologies are employed that inform the driver of potential hazards or that avoid collisions, for example through the initiation of safety measures or through taking over vehicle control. In the case of automatic vehicles, driver support systems can take over the control of the vehicle. Adaptive features can automate the lights, provide adaptive cruise control, automate the brakes, incorporate traffic announcements, establish connections to smart phones, give the driver alarms related for example to other vehicles or various types of hazard, keep the vehicle in the correct lane or show what is located in dead angles. Driver support systems include the above-mentioned driver assistance systems, and are usually dependent on input from a plurality of data sources such as for example the vehicle-side image capturing, image processing, radar sensors, lidar, ultrasonic sensors and other sources. Neural networks have lately been employed in the processing of inputs of such data within the driver assistance system or, generally, within driver support systems.

Parking assistance systems that can support a driver of a vehicle in parking procedures are already known from the prior art. Such parking assistance systems recognize parking spaces or parking-space-like partial regions in a surrounding region of the vehicle as the vehicle drives past the parking-space-like partial regions in that for example adjacent objects in the parking-space-like partial region as well as dimensions or geometrical measurements of the parking-space-like partial region are recognized. Parking assistance systems usually measure the parking space for this purpose, and recognize for example a length, a width and a depth of the parking space, as well as a relative position of the parking space with respect to the vehicle. In most cases, such parking space information is acquired with vehicle-side distance sensors, ultrasonic sensors for example.

For such parking assistance systems it is not, however, possible, when parking-space-like partial regions are acquired, to distinguish between legal, parkable parking spaces and illegal parking spaces that cannot be used for parking. Legal, parkable parking spaces are for example such parking zones as those in which the vehicle can be left or parked in conformity with traffic regulations. Illegal parking spaces are for example no-parking zones, house and courtyard entryways, bus stops, green verges, fire service approach zones, etc. While these illegal parking spaces are indeed recognized by the assistance system and provided or indicated to the driver as potential parking spaces, which is a case of "false positive parking spaces"; the vehicle may not, however, be left in such an illegal parking space. Parking assistance systems that are based on ultrasonic data have, in particular, a high rate of false positive parking spaces. It is also very difficult to distinguish between parallel parking spaces and bay parking spaces on the basis of ultrasonic data. A large space can for example either represent a parallel parking space (parallel to the carriageway) or two bay parking spaces (perpendicular to the carriageway). The consequence is that such usual parking assistance systems are not as a rule able to determine the correct parking manoeuvre, and a manual selection on the part of the driver is therefore necessary.

In the more recent past, driver assistance systems that comprise camera systems ("surround view systems") have become increasingly popular. In addition, more and more research results relating to neural networks, known as deep neural networks (DNNs), and in particular to convolutional neural networks (CNNs), are available. The development of such neural networks has been accelerated through the rise in the performance of computer systems.

Convolutional neural networks (CNNs) are very successful in applications for classification and categorization, but the predominant part of the research has only been concerned with conventional photometric RGB images, and has not had a focus on integrated vehicle equipment. On top of this, the integrated hardware equipment for vehicles must have a low energy consumption, and therefore has only a low computing capacity.

In the field of machine learning, convolutional neural networks are a class of deep, feedforward, artificial neural networks that have already been applied in the analysis of visual images. CNNs use multi-layer perceptrons that are so designed that they only require minimal preprocessing. Convolutional neural networks were inspired by biological processes, wherein their switching pattern between neurons mimics the organization of the animal visual cortex. Individual cortical neurons only respond to stimuli in a limited region of the visual field that is known as the receptive field. The receptive fields of various neurons partially overlap, so that they cover the entire visual field.

CNNs use relatively little preprocessing in comparison with other algorithms for image classification. This means that the network learns the filter that must be prepared by hand in conventional algorithms. This independence of previously available knowledge and human labour in the preparation of features is a great advantage. CNNs find application in image and video recognition, in recommender systems and in speech recognition.

DE 10 2012 216 994 A1 discloses a method for parking place mediation, wherein traffic participants ascertain information about free parking places and transmit the information to a cloud computing system. The cloud computing system accepts information about the free parking places that can be called up in a free parking place map. Such information, which is determined on the vehicle side and transmitted to the cloud computing system, can for example be meta-information about the parking places that is for example obtained by a sign recognition carried out on the vehicle side. Such signs are for example "no stopping" signs, or signs to identify parking places reserved for residents, disabled persons, families, women or are private; they are recognized by a vehicle-side camera system and image processing, and are linked to the corresponding information about the parking place.

The disadvantage of such a known system is that camera-based information recognition of this sort requires high computing capacity, and suitable resources must as a consequence be made available at the vehicle. Equally, such a system cannot distinguish between parallel parking spaces (parallel to the carriageway) and bay parking spaces (perpendicular to the carriageway), and is highly dependent on the parking spaces being well-signed. Such a system is also not capable of independent learning.

US 2014/0340242 A1 discloses a method for transmitting information about free parking places within at least one city block, wherein traffic participants receive visual information about the probability distribution of free parking places in the city block that is based on historical data and current data from a central database. The historical data and current data are based on image data from vehicles and/or image data from camera systems permanently installed in the city.

WO2014/202362 discloses a method for the provision of parking information about free parking places, wherein a) respective historical and current information about available, free parking places for the at least one street is ascertained, wherein at least one parking segment that comprises one or a plurality of streets is ascertained from the ascertained information, and for each parking segment respective statistical parameters about free parking places are generated from the ascertained information; b) a modelling is generated for each parking segment in which the information ascertained for the parking segment is processed in order to determine a parking state of the respective parking segment as a probability distribution ($P_i$).

US 2014/0085112 A1 discloses a method for the provision of statistical data on the availability of parking places, wherein a central server computer receives sensor data from a large number of vehicles that contain location coordinates thereof, wherein the central server computer converts these data into statistical information about parking places.

The field of driver support systems, in particular driver assistance systems or advanced driver assistance systems (ADAS), is one of the fastest-growing in vehicle electronics. There is therefore a need for improved methods and systems for the recognition or classification of parking spaces.

SUMMARY

Starting from the prior art referred to above, the invention is thus based on the object of providing a method that can automatically classify potential parking spaces recognized in a surrounding region of a vehicle.

The object is achieved according to the invention through the features of the independent claims. Advantageous embodiments of the invention are disclosed in the dependent claims.

The invention makes a method available for the classification of parking spaces in a surrounding region of a vehicle with a driver support system, wherein the vehicle comprises at least one first surroundings sensor and a second surroundings sensor, comprising the steps of receiving first sensor data out of the surrounding region by the driver support system from the at least one first surroundings sensor, recognizing a parking-space-like partial region of the surrounding region in the first sensor data, requesting second sensor data acquired by the at least one second surroundings sensor out of the parking-space-like partial region by the driver support system as soon as the parking-space-like partial region is recognized in the first sensor data, transmitting the requested second sensor data to a vehicle-side computing unit comprising a deep neural network (DNN), and classifying the parking-space-like partial region into categories with the DNN, wherein the categories comprise legal, parkable parking spaces and illegal, non-parkable parking spaces.

According to the invention a method is thus given for the classification of parking spaces in a surrounding region of a vehicle with a driver support system that recognizes potential parking spaces on the basis of first sensor data of the driver support system, then requests sensor data, preferably image data and/or video sequences of a camera system, and transmits these to a computing unit comprising a deep neural network (DNN), whereupon the DNN then classifies the parking-space-like partial region into categories, wherein the categories comprise legal, parkable parking spaces and illegal, non-parkable parking spaces.

The fundamental idea of the present invention is thus to have the classification of parking spaces carried out on the basis of second sensor data, preferably image data, by a deep neural network (DNN), wherein the DNN is preferably pre-trained.

In one form of embodiment of the invention, the step of receiving first sensor data with the at least one first surroundings sensor can comprise a reception of distance sensor data of at least one vehicle-side distance sensor, in particular a reception of ultrasonic sensor data and/or radar sensor data and/or laser scanner data by the driver support system.

In a further form of embodiment of the invention, the reception of the second sensor data can comprise a reception of image data of one or a plurality of images and/or video sequences with at least one camera system comprising one or a plurality of cameras by the driver support system. The image data and/or video sequences can for example be made available by a "surround view system".

In one preferred form of embodiment, as soon as the parking-space-like partial region has been acquired by the driver support system on the basis of the first sensor data, a trigger signal ("trigger", or preferably "image capture trigger") is generated for the at least one second surroundings sensor, through which the second surroundings sensor is made to acquire the second sensor data from the surrounding region comprising the parking-space-like partial region. The second sensor data can preferably be image data and/or video sequences that are made available by at least one second surroundings sensor, preferably a camera system.

In a further preferred form of embodiment of the invention, at least one geometrical dimension, determined on the basis of the first sensor data, of the parking-space-like partial region can be transmitted to the vehicle-side computing unit comprising a deep neural network (DNN) as at least one item of information about the parking-space-like partial region, together with the requested second sensor data.

It is also provided according to the invention that the result of the classification of the parking space into categories by the deep neural network (DNN) can be transmitted to the driver support system. These categories comprise legal, parkable parking spaces and illegal, non-parkable parking spaces. The legal, parkable parking spaces can here preferably comprise parallel parking spaces (parallel to the carriageway, parallel parking spaces) and bay parking spaces (perpendicular to the carriageway, perpendicular parking spaces).

Illegal, non-parkable parking spaces can for example be no-parking zones, house and courtyard entryways, bus stops, green verges, fire service approach zones and parking places for the disabled. After transmitting the result of the classification of the parking spaces into categories by the deep neural network (DNN), the driver support system can initiate a suitable parking manoeuvre that can be performed at least semi-automatically, in particular fully automatically.

In one particularly advantageous form of embodiment of the invention the classification of the parking-space-like partial region can be performed with the deep neural network (DNN) that has a convolutional neural network (CNN).

In an advantageous embodiment of the invention it is further provided that the deep neural network (DNN) can be pre-trained for the classification of parking spaces, while the pre-training of the deep neural network (DNN) can be performed through access to data of a database or through vehicle-side recording of second sensor data, preferably image data and/or video sequences.

The pre-training of the deep neural network (DNN) can be performed online or off-line. In the online mode ("online") the deep neural network (DNN) can access data of a database that has already been filled with second sensor data, preferably image data, that has been transmitted from other vehicles, e.g. from development vehicles, to a cloud server via a mobile network. The actual learning process of the DNN can also be performed in off-line mode ("off-line") following the input of these second sensor data.

The second sensor data, preferably image data and/or video sequences, of this database are preferably manually marked or annotated. The pre-training of the deep neural network (DNN) can also be performed through vehicle-side recording of second sensor data, preferably image data, that can be used for learning or pre-training the DNN, preferably in off-line mode.

In an advantageous embodiment of the invention it is further provided that the classification of the parking-space-like partial region into parkable parking spaces and illegal, non-parkable parking spaces, comprises a classification of the parkable parking spaces into parallel parking spaces and bay parking spaces. This means that the deep neural network (DNN) is designed to distinguish between parallel parking spaces (parallel to the carriageway) and bay parking spaces (perpendicular to the carriageway). The possibility of the classification of legal, parkable parking spaces into categories comprising parallel parking spaces (parallel to the carriageway) and bay parking spaces (perpendicular to the carriageway) is a particularly advantageous aspect of the method according to the invention.

The invention further provides for the use of the method according to the invention in a driver support system of a vehicle.

The invention further provides for a driver support system, in particular a parking assistance system, for a vehicle for the acquisition of parking spaces in a surrounding region of the vehicle, comprising at least one first surroundings sensor for the acquisition of first sensor data from the surrounding region, at least one second surroundings sensor different from the first surroundings sensor for the acquisition of second sensor data from the surrounding region, and a vehicle-side computing unit comprising a deep neural network (DNN) for the classification of the parking-space-like partial region into categories.

According to the invention, the categories used by the deep neural network (DNN) for classification comprise legal, parkable parking spaces and illegal, non-parkable parking spaces. Legal, parkable parking spaces can preferably comprise parallel parking spaces (parallel to the carriageway) and bay parking spaces (perpendicular to the carriageway). This means that the deep neural network (DNN) of the driver support system can be capable of distinguishing between parallel parking spaces (parallel to the carriageway, parallel parking spaces) and bay parking spaces (perpendicular to the carriageway, perpendicular parking spaces). The possibility of the classification of legal, parkable parking spaces into categories comprising parallel parking spaces (parallel to the carriageway) and bay parking spaces (perpendicular to the carriageway) is a particularly advantageous aspect of the driver support system and vehicle according to the invention.

The at least one first surroundings sensor can comprise at least one distance sensor that can be chosen from ultrasonic sensors, radar sensors and laser scanners. The at least one second surroundings sensor can comprise at least one camera system that can comprise one or a plurality of cameras. The at least one camera system can for example be a "surround view system".

In one particularly advantageous form of embodiment of the invention, the deep neural network (DNN) of the driver support system can comprise a convolutional neural network (CNN) that can preferably be a binary convolutional neural network (CNN). Such a binary CNN can for example be a network based on a Python architecture that offers advantages in terms of a simplest possible definition of the network architecture and training. A C-code generator can be used here, wherein the generated code in the trained network is independent and can be integrated easily into installed equipment and devices. Because of its internal division of variables, a binary CNN can advantageously only have a low requirement for memory space.

The driver assistance system, in particular parking assistance system, can be designed to park the vehicle at least semi-automatically, in particular fully automatically, into a parkable parking space.

The invention further provides for a computer program product for carrying out the method according to the invention.

The invention also relates to a vehicle with the driver support system, in particular parking assistance system, according to the invention. The vehicle can in particular be a passenger car.

The invention is explained in more detail below with reference to the attached figures and on the basis of preferred forms of embodiment. The features described can represent an aspect of the invention both individually and in combination. Features of different exemplary embodiments can be transferred from one exemplary embodiment to another. In the figures, identical and functionally identical elements are provided with the same reference numerals. The exemplary embodiments described below are only provided for illustration, and are not intended to restrict the invention in any way.

DETAILED DESCRIPTION

Figure 1:
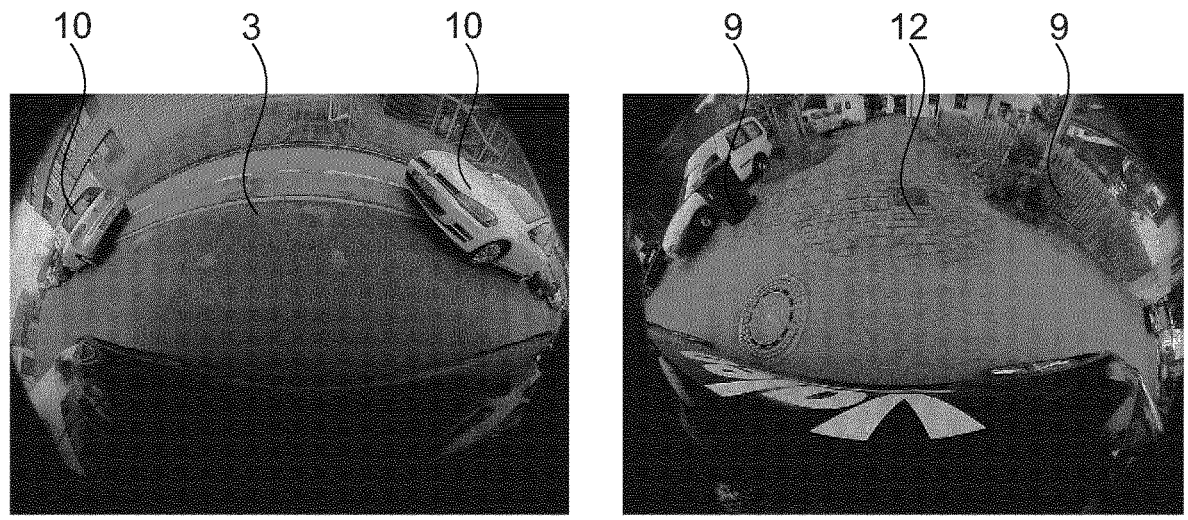
FIG. 1 shows a schematic view of a legal, parkable parking space (left) that is a parallel parking space parallel to the carriageway, and an illegal, non-parkable parking space (right) that is a courtyard entryway, made available in the form of second sensor data, in this case image data and/or video sequences, that are made available through at least one second surroundings sensor, in this case at least one camera system comprising one or a plurality of cameras.

FIG. 1 shows a schematic view that is made available by a second surroundings sensor 14, in this case a camera system, of a vehicle 1 of the present invention. A legal, parkable parking space 3 is shown on the left, being a parallel parking space parallel to the carriageway and located between two further vehicles 10. An illegal, non-parkable parking space 12 is shown on the right, being a courtyard entryway that is bounded by objects 9, in this case a refuse bin on the left and a fence on the right. This view is made available in the form of second sensor data, in this case image data and/or video sequences that are acquired by at least one second surroundings sensor 14, in this case a camera system comprising at least one camera, and transmitted to a driver support system 7 comprising a computing unit 16 with a deep neural network (DNN).

Figure 2:
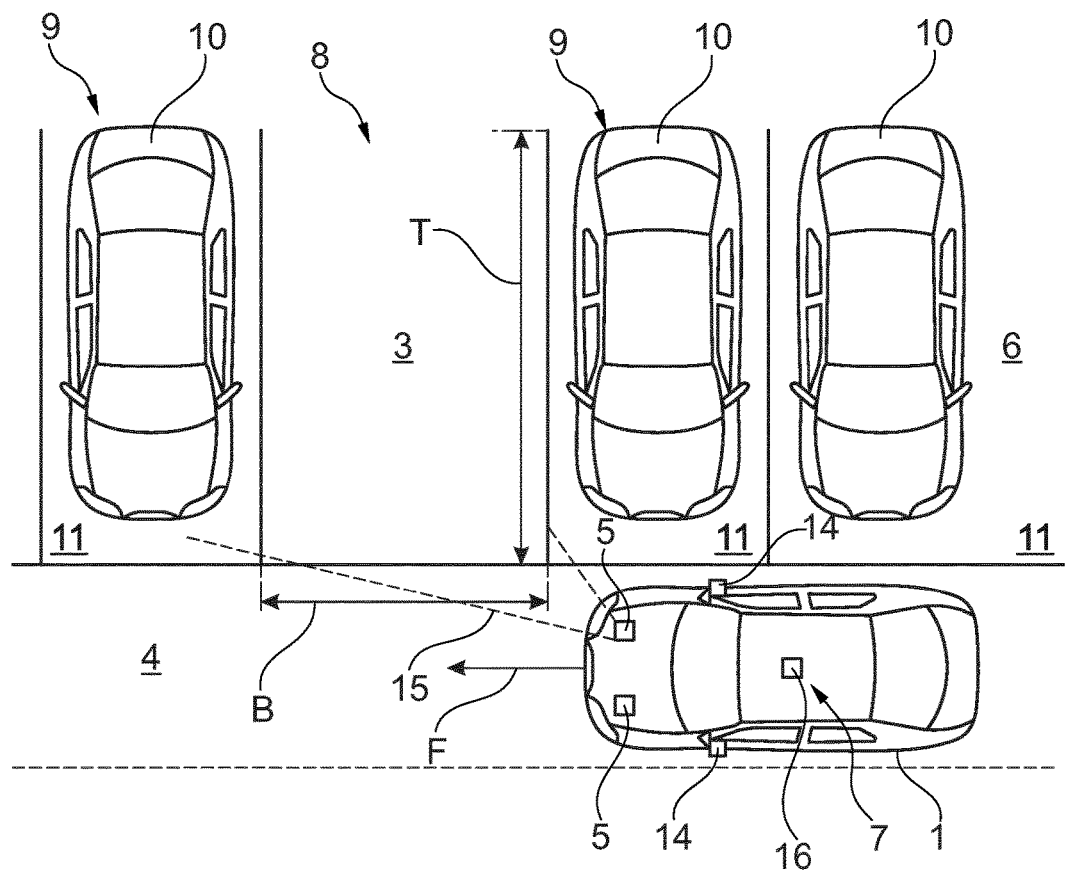
FIG. 2 shows a schematic view of a vehicle according to a first, preferred form of embodiment, that in the present case is designed as a passenger car and that comprises a driver support system, in particular a parking assistance system, that assists a driver of the vehicle in the search for legal, parkable parking spaces in a surrounding region.

FIG. 2 shows a vehicle 1 according to a first, preferred form of embodiment of the present invention. In the present case the vehicle 1 is designed as a passenger car, and comprises a driver support system 7 that is implemented in this case as a parking assistance system that supports a driver of the vehicle 1 when searching for legal, parkable parking spaces 3. The legal, parkable parking space 3 is, in this case, formed as a bay parking space, perpendicular to the carriageway 4. The driver support system 7, in particular parking assistance system, can also be designed to park the vehicle 1 at least semi-automatically, in particular fully automatically, into the parkable parking space 3. The vehicle 1 comprises at least one first surroundings sensor 5 and a second surroundings sensor 14.

A method is provided according to the invention for the classification of parking spaces 3, 12 in a surrounding region 6 of a vehicle 1 with a driver support system 7, comprising the steps of receiving first sensor data out of the surrounding region 6 by the driver support system 7 from the at least one first surroundings sensor 5, recognizing a parking-space-like partial region 8 of the surrounding region 6 in the first sensor data, requesting second sensor data acquired by the at least one second surroundings sensor 14 out of the parking-space-like partial region 8 by the driver support system 7 as soon as the parking-space-like partial region 8 is recognized in the first sensor data; transmitting the requested second sensor data to a vehicle-side computing unit 16 comprising a deep neural network (DNN), and classifying the parking-space-like partial region 8 into categories with the DNN, wherein the categories comprise legal, parkable parking spaces 3 and illegal, non-parkable parking spaces 12.

To detect legal parking spaces 3, the vehicle 1 can continue to move, for example in the forward direction F along a carriageway 4. The step of the reception of first sensor data with the at least one first surroundings sensor 5 can for example comprise reception of distance sensor data of at least one vehicle-side distance sensor, in particular reception of ultrasonic sensor data and/or radar sensor data and/or laser scanner data, by the driver support system 7. The reception of the second sensor data comprises, as a rule, a reception of image data of one or a plurality of images from at least one second surroundings sensor 14, preferably a camera system comprising one or a plurality of cameras, by the driver support system 7. The image data can for example be made available by a "surround view system".

A parking-space-like partial region 8 in the surrounding region 6 can be recognized in the first sensor data. This parking-space-like partial region 8 can for example be an unoccupied region, bounded by objects 9, in the surrounding region 6. The bounding objects 9 are shown here as further vehicles 10 that are parked in parking spaces 11 next to the parking-space-like partial region 8. This parking-space-like partial region 8 between the two bounding objects 9 can be measured in that, with reference to the first sensor data, at least one geometric dimension of the region, in particular a width B and a depth T, is recognized. On the basis of the width B and the depth T, it is possible to recognize that the partial region 8 can be a potential parking space for the vehicle 1. It is not, however, possible to classify on the basis of the first sensor data whether it is a legal parking space 3, parkable for the vehicle 1, as is shown in FIG. 2, or an illegal parking space 12, not parkable for the vehicle 1, as is shown for example in FIGS. 3 and 4. In the case of a legal parking space 3 according to FIG. 2, this is a free parking space, in this case a bay parking space perpendicular to the carriageway, in which the vehicle 1 can be left in accordance with traffic regulations. In the case of the illegal parking space 12 according to FIG. 3, this is a green verge 13 on which the vehicle 1 may not be left. In the case of the illegal parking space 12 according to FIG. 4, this is a further road on which the vehicle 1 may not be left.

In one preferred form of embodiment, as soon as the parking-space-like partial region 8 has been acquired by the driver support system 7 on the basis of the first sensor data, a trigger signal ("trigger", or preferably "image capture trigger") is generated for the at least one second surroundings sensor 14, through which the second surroundings sensor 14 is made to acquire the second sensor data from the surrounding region 6 comprising the parking-space-like partial region 8. The second sensor data are preferably image data and/or video sequences that are made available by at least one second surroundings sensor 14, preferably at least one camera system. This can for example be a "surround view system" that comprises multiple cameras.

The at least one second surroundings sensor 14 acquires second sensor data from the surrounding region 6. The at least one second surroundings sensor 14 is, in the present case, designed as at least one camera, and acquires camera images and/or video sequences as the second sensor data. As soon as the parking-space-like partial region 8 has been recognized or identified by the driver support system 7 on the basis of the first sensor data, the driver support system 7 requests second sensor data from the parking-space-like partial region 8 from the second surroundings sensor 14. It is in particular possible here for only the second sensor data of those second surroundings sensors 14 whose acquisition region overlaps at least in some regions with an acquisition region 15 of the first surroundings sensor 5 to be requested.

Figure 3:
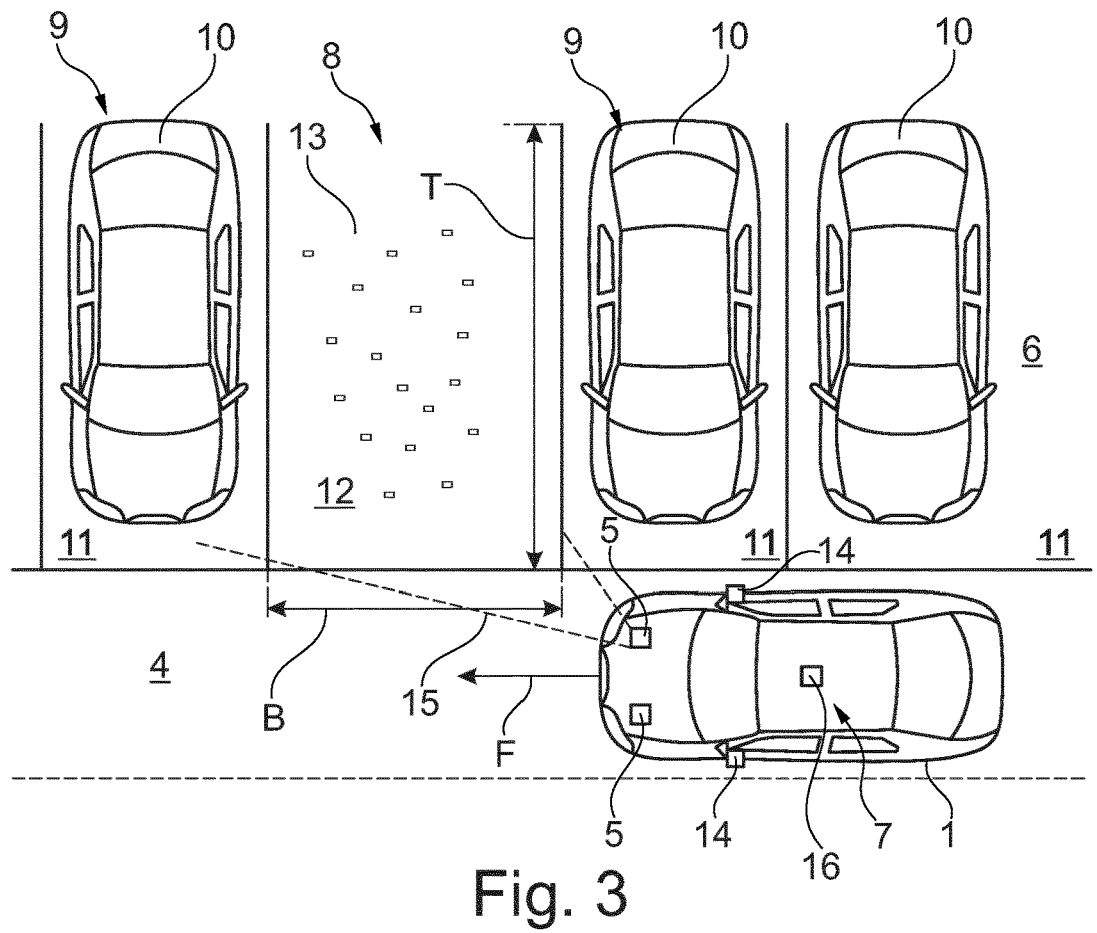
FIG. 3 shows a schematic view of the vehicle according to FIG. 2 while searching for a parking space in a surrounding region with an illegal parking space that represents a green verge.
Figure 4:
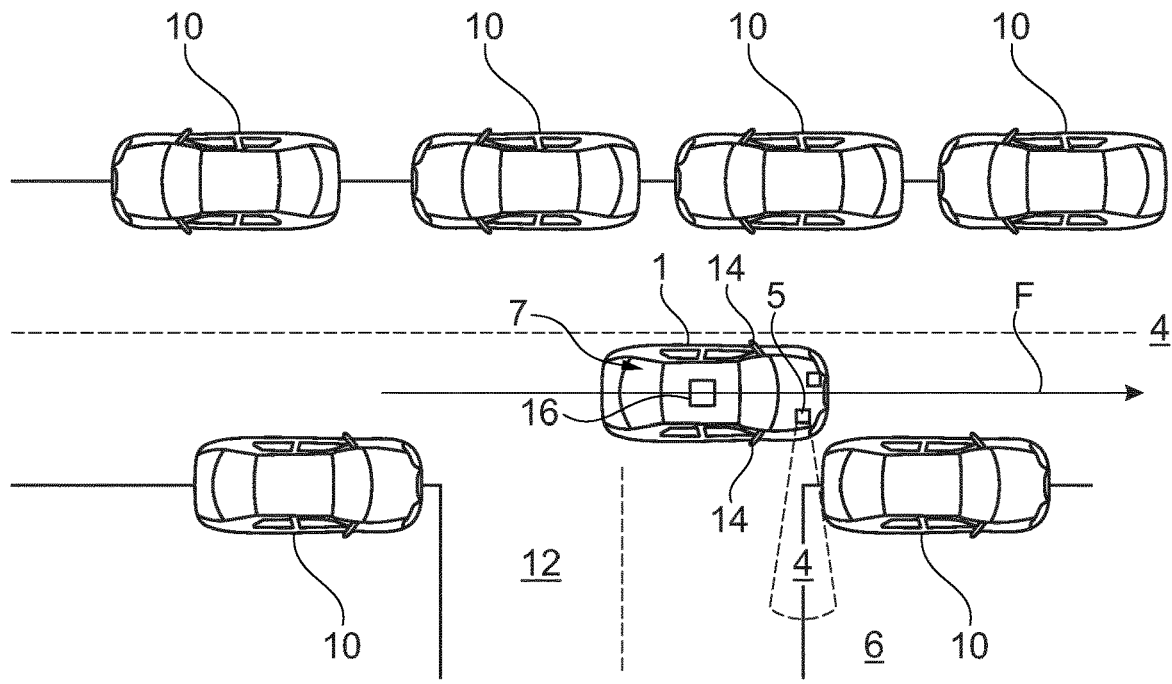
FIG. 4 shows a schematic view of the vehicle according to FIG. 2 while searching for a parking space in a surrounding region with an illegal parking space that represents a further street.

In the present case of FIGS. 2 and 3, this means that only the camera images of those cameras that display the parking-space-like partial region 8, i.e. in this case the images of the camera at a right-hand outside mirror of the vehicle 1, are requested. Moreover, it is possible in particular for only the second sensor data to be requested that was acquired at approximately the same time as that of the particular first sensor data on the basis of which the parking-space-like partial region 8 was recognized. For example, an image or snapshot of the parking-space-like partial region 8 can be acquired by the camera as soon as the parking-space-like partial region 8 is acquired on the basis of the first sensor data. The acquisition of the parking-space-like partial region 8 is thus a trigger signal or trigger ("image capture trigger") for the at least one second surroundings sensor 14.

In a further preferred form of embodiment of the invention, at least one geometrical dimension (B, T), determined on the basis of the first sensor data, of the parking-space-like partial region 8 is transmitted to the vehicle-side computing unit 16 comprising a deep neural network (DNN) as at least one item of information about the parking-space-like partial region 8, together with the requested second sensor data.

The result of the classification of the parking space 3, 12 into categories by the deep neural network (DNN) is preferably transmitted to the driver support system 7. These categories comprise legal, parkable parking spaces 3 and illegal, non-parkable parking spaces 12. The legal, parkable parking spaces 3 can moreover preferably be classified into parallel parking spaces (parallel to the carriageway, parallel parking spaces, FIG. 1, left) and bay parking spaces (perpendicular to the carriageway, perpendicular parking spaces, FIG. 2). Illegal, non-parkable parking spaces 12, as illustrated in FIG. 1, right and in FIGS. 3 and 4 can for example be no-parking zones, house and courtyard entryways, bus stops, green verges, fire service approach zones and parking places for the disabled and other roads.

The classification of the parking-space-like partial region 8 with the deep neural network (DNN) preferably takes place with a convolutional neural network (CNN).

The deep neural network (DNN) can be pre-trained for the classification of parking spaces 3, 12, while the pre-training of the deep neural network (DNN) can be performed through access to data of a database, in particular a cloud server 17, or through vehicle-side recording of second sensor data, preferably image data and/or video sequences.

Figure 5:
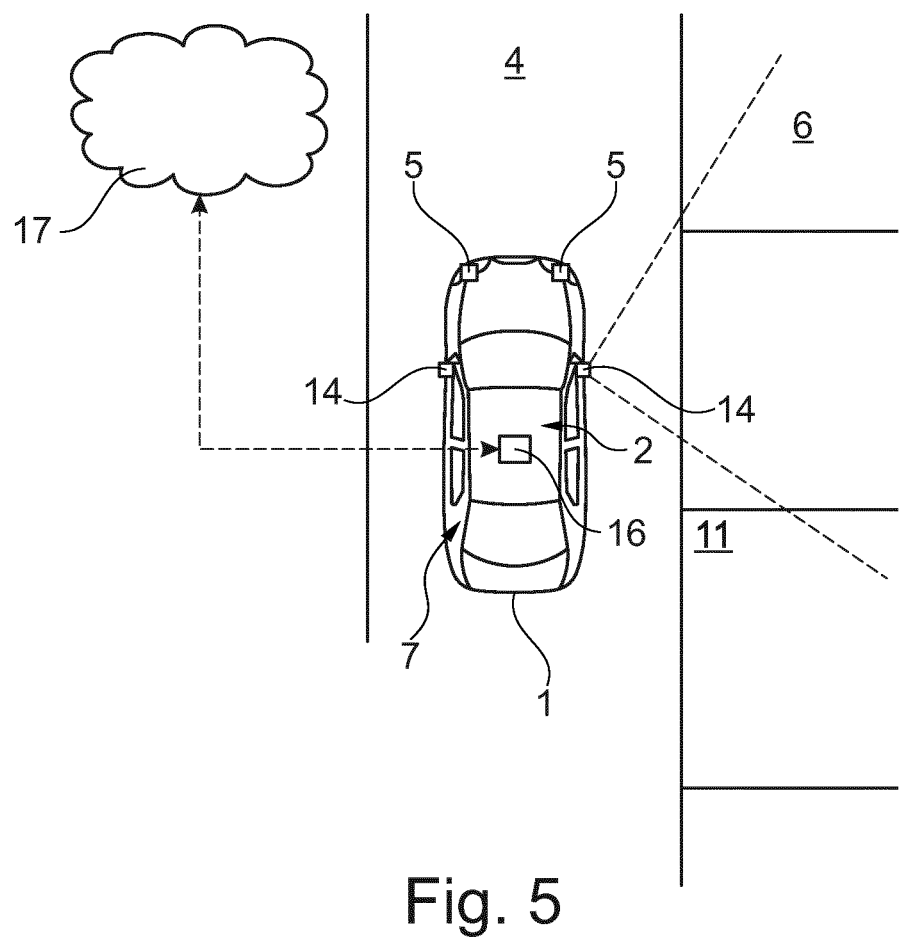
FIG. 5 shows a schematic view of the vehicle that can receive second sensor data from a database online, in particular a cloud server, for pre-training the deep neural network (DNN) and can alternatively, through at least one second surroundings sensor, in this case one or a plurality of cameras, acquire second sensor data, in this case image data and/or video sequences.

The pre-training of the deep neural network (DNN) can be performed online or off-line. In the online mode ("online") the deep neural network (DNN) can access data of a database, in particular a cloud server 17, that has already been filled with second sensor data, preferably image data, that has been transmitted from other vehicles, e.g. from development vehicles, to the database, such as a cloud server 17 via a mobile network. The actual learning process of the DNN can also be performed in off-line mode ("off-line") following the input of these second sensor data. The second sensor data, preferably image data and/or video sequences, of this database are preferably manually marked or annotated. The pre-training of the deep neural network (DNN) can also be performed through vehicle-side recording of second sensor data, preferably image data and/or video sequences, that are used for learning or pre-training, preferably in off-line mode. FIG. 5 shows in this connection a plan view of the vehicle 1 that can receive the second sensor data from a database, cloud server 17, for pre-training online and, alternatively, can acquire second sensor data, in this case image data, through at least one second surroundings sensor 14, in this case a camera. The pretraining of the deep neural network (DNN) can be performed off-line with the aid of these second sensor data, which means that the driver support system 7 comprising the computing unit 16 does not have to be in online mode for pretraining the DNN. Alternatively, the pretraining of the DNN can be performed through vehicle-side recording of second sensor data, in particular image data and/or video sequences, by a second surroundings sensor 14, in this case a camera in the right-hand outside mirror. For this purpose again, the driver support system 7 comprising the computing unit 16, does not have to be in online mode.

A driver support system 7, in particular a parking assistance system, is provided according to the invention for a vehicle 1 for the acquisition of parking spaces 3, 12 in a surrounding region 6 of the vehicle 1, comprising at least one first surroundings sensor 5 for the acquisition of first sensor data from the surrounding region 6, at least one second surroundings sensor 14 different from the first surroundings sensor 5 for the acquisition of second sensor data from the surrounding region 6, and a vehicle-side computing unit 16 comprising a deep neural network (DNN) for the classification of the parking-space-like partial region 8 into categories.

The at least one second surroundings sensor 14 comprises, in particular, at least one camera system that comprises one or a plurality of cameras, for example right-side and left-side outside mirror cameras, as are shown in FIGS. 2, 3, 4 and 5. The at least one camera system can for example be a "surround view system", and preferably supplies images and/or video sequences, as are shown in FIG. 1.

The deep neural network (DNN) of the driver support system 7 comprises, in particular, a convolutional neural network (CNN) that is preferably a binary convolutional neural network (CNN). Such a binary CNN can for example be a network based on a Python architecture that offers advantages in terms of a simplest possible definition of the network architecture and training. A C-code generator is used here as a rule, wherein the generated code in the trained network is independent and can be integrated easily into installed equipment and devices. Because of its internal division of variables, a binary CNN advantageously has only a low requirement for memory space. The binary CNN can for example have an architecture that comprises a "convolutional layer" with 16 filters, 1 fully connected layer and an output of 10 classes.

The driver support system 7 is designed to park the vehicle 1 at least semi-automatically, in particular fully automatically, into a legal, parkable parking space 3. A computer program product for carrying out the method according to the invention is further provided. A vehicle 1 with the driver support system 7 according to the invention is also made available. The vehicle 1 is as a rule a passenger car.

LIST OF REFERENCE SIGNS

1 Vehicle
3 Legal, parkable parking space
4 Carriageway
5 First surroundings sensor
6 Surrounding region
7 Driver support system
8 Parking-space-like partial region
9 Object
10 Further vehicle
11 Parking space
12 Illegal, non-parkable parking space 13 Green verge
14 Second surroundings sensor
15 Acquisition region of the first surroundings sensor
16 Vehicle-side computing unit
17 Cloud server

The invention claimed is:

1. A method for the classification of parking spaces in a surrounding region of a vehicle with a driver support system, wherein the vehicle comprises at least one first surroundings sensor and one second surroundings sensor, the method comprising:
receiving first sensor data out of the surrounding region by the driver support system from the at least one first surroundings sensor;
recognizing a parking-space-like partial region of the surrounding region in the first sensor data;
requesting second sensor data acquired by the at least one second surroundings sensor out of the parking-space-like partial region by the driver support system as soon as the parking-space-like partial region is recognized in the first sensor data;
transmitting the requested second sensor data to a vehicle-side computing unit comprising a deep neural network (DNN); and
classifying the parking-space-like partial region into categories with the DNN, wherein the categories comprise legal, parkable parking spaces and illegal, non-parkable parking spaces,
wherein the deep neural network (DNN) is pre-trained for the classification of parking spaces, and wherein the pre-training of the deep neural network (DNN) is done through vehicle-side recording of second sensor data comprising image data.

2. The method according to claim 1, wherein receiving first sensor data with the at least one first surroundings sensor comprises a reception of distance sensor data of at least one vehicle-side distance sensor, wherein distance sensor data comprises a reception of ultrasonic sensor data, radar sensor data, or laser scanner data, by the driver support system.

3. The method according to claim 1, wherein the reception of the second sensor data comprises a reception of image data of one or a plurality of images and/or video sequences with at least one camera system comprising one or a plurality of cameras by the driver support system.

4. The method according to claim 1, wherein as soon as the parking-space-like partial region has been acquired by the driver support system on the basis of the first sensor data, a trigger signal is generated for the at least one second surroundings sensor, through which the second surroundings sensor is made to acquire the second sensor data from the surrounding region comprising the parking-space-like partial region.

5. The method according to claim 1, wherein at least one geometrical dimension, determined on the basis of the first sensor data, of the parking-space-like partial region is transmitted to the vehicle-side computing unit comprising at least one item of information about the parking-space-like partial region, together with the requested second sensor data.

6. The method according to claim 1, wherein the result of the classification of the parking space into categories by the deep neural network (DNN) is transmitted to the driver support system, wherein the legal, parkable parking spaces comprise parallel parking spaces and bay parking spaces.

7. The method according to claim 1, wherein the classification of the parking-space-like partial region is performed with the deep neural network (DNN) that has a convolutional neural network (CNN).

8. The method according to claim 1, wherein the classification of the parking-space-like partial region into parkable parking spaces and illegal, non-parkable parking spaces comprises a classification of the parkable parking spaces into parallel parking spaces and bay parking spaces.

9. A driver support system comprising a parking assistance system for a vehicle for the acquisition of parking spaces in a surrounding region of the vehicle, comprising at least one first surroundings sensor for the acquisition of first sensor data from the surrounding region, at least one second surroundings sensor different from the first surroundings sensor for the acquisition of second sensor data from the surrounding region, and a vehicle-side computing unit comprising a deep neural network (DNN) for the classification of a parking-space-like partial region into categories,
wherein the deep neural network (DNN) is pre-trained for the classification of parking spaces, while the pre-training of the deep neural network (DNN) is done through vehicle-side recording of second sensor data comprising image data.

10. The driver support system according to claim 9, wherein the at least one first surroundings sensor comprises at least one distance sensor that is chosen from ultrasonic sensors, radar sensors and laser scanners, and the at least one second surroundings sensor comprises at least one camera system that preferably comprises one or a plurality of cameras.

11. The driver support system according to claim 9, wherein the deep neural network (DNN) comprises a convolutional neural network (CNN) that is a binary convolutional neural network (CNN).

12. A vehicle with the driver support system comprising the parking assistance system, according to claim 9.

13. A non-transitory machine-readable medium comprising a plurality of machine-readable instructions executed by one or more processors, the plurality of machine-readable instructions causing the one or more processors to perform operations for a classification of parking spaces in a surrounding region of a vehicle with a driver support system, wherein the vehicle comprises at least one first surroundings sensor and one second surroundings sensor, the operations comprising:
receiving first sensor data out of the surrounding region by the driver support system from the at least one first surroundings sensor;
recognizing a parking-space-like partial region of the surrounding region in the first sensor data;
requesting second sensor data acquired by the at least one second surroundings sensor out of the parking-space-like partial region by the driver support system as soon as the parking-space-like partial region is recognized in the first sensor data;
transmitting the requested second sensor data to a vehicle-side computing unit comprising a deep neural network (DNN); and
classifying the parking-space-like partial region into categories with the DNN, wherein the categories comprise legal, parkable parking spaces and illegal, non-parkable parking spaces,
wherein the deep neural network (DNN) is pre-trained for the classification of parking spaces, while the pre-training of the deep neural network (DNN) is done through vehicle-side recording of second sensor data comprising image data.

\* \* \* \* \*